(12) United States Patent
Iizuka et al.

(10) Patent No.: US 11,788,552 B2
(45) Date of Patent: Oct. 17, 2023

(54) ROTARY MACHINE WITH COOLING JACKET INCLUDING HELICAL GROOVE

(71) Applicant: IHI Corporation, Tokyo (JP)

(72) Inventors: Kuniaki Iizuka, Tokyo (JP); Yuji Sasaki, Tokyo (JP); Tatsumi Inomata, Tokyo (JP); Ryosuke Yumoto, Tokyo (JP); Kai Iijima, Tokyo (JP); Tatsuya Fukui, Tokyo (JP); Hikaru Sugiura, Tokyo (JP); Yoshihito Katsu, Tokyo (JP)

(*) Notice: Subject to any disclaimer, the term of this patent is extended or adjusted under 35 U.S.C. 154(b) by 294 days.

(21) Appl. No.: 17/133,628

(22) Filed: Dec. 24, 2020

(65) Prior Publication Data

US 2021/0115925 A1    Apr. 22, 2021

Related U.S. Application Data

(63) Continuation of application No. PCT/JP2019/012961, filed on Mar. 26, 2019.

(30) Foreign Application Priority Data

Jun. 28, 2018  (JP) .................................. 2018-122926

(51) Int. Cl.
*F04D 29/58*  (2006.01)
*F04C 29/04*  (2006.01)
(Continued)

(52) U.S. Cl.
CPC .......... *F04D 29/5806* (2013.01); *F04C 29/04* (2013.01); *F04D 25/06* (2013.01);
(Continued)

(58) Field of Classification Search
CPC .... F04D 29/06; F04D 29/584; F04D 29/5806; H02K 5/203; F05D 2250/25; F05D 2250/294; F05D 2250/281; F04C 29/04
See application file for complete search history.

(56) References Cited

U.S. PATENT DOCUMENTS

| | | | |
|---|---|---|---|
| 2009/0009013 A1 | 1/2009 | Baumann et al. | |
| 2009/0026857 A1* | 1/2009 | Lavall ................... | H02K 5/203 310/58 |

(Continued)

FOREIGN PATENT DOCUMENTS

| | | |
|---|---|---|
| CN | 1545185 | 11/2004 |
| CN | 107228094 | 10/2017 |

(Continued)

OTHER PUBLICATIONS

International Search Report dated Jun. 25, 2019 for PCT/JP2019/012961.

(Continued)

*Primary Examiner* — Kenneth J Hansen
(74) *Attorney, Agent, or Firm* — SOEI PATENT & LAW FIRM

(57) ABSTRACT

An example rotary machine includes a motor including a rotor and a stator, and a cooling jacket disposed around the stator. The cooling jacket includes an inner body part being cylindrical and in contact with the stator, an outer body part being cylindrical and surrounding the inner body part, and a groove through which a cooling medium passes, the groove circling helically around an outer circumference of the inner body part at least once. The groove has a pair of side surfaces opposed in a direction of an axis of rotation of the rotor, and a bottom surface connected to each of the pair of side surfaces. Each of the pair of side surfaces is formed having a draft angle inclined away from each other, the draft angle inclined relative to a release direction orthogonal to the axis of rotation.

16 Claims, 10 Drawing Sheets

(51) Int. Cl.
  *H02K 5/20* (2006.01)
  *F04D 25/06* (2006.01)
  *H02K 5/06* (2006.01)
  *H02K 7/14* (2006.01)
  *H02K 15/14* (2006.01)
  *F04D 13/06* (2006.01)

(52) U.S. Cl.
  CPC .......... *F04D 29/584* (2013.01); *H02K 5/06* (2013.01); *H02K 5/203* (2021.01); *H02K 7/14* (2013.01); *H02K 15/14* (2013.01); *F04D 13/06* (2013.01); *F05D 2250/25* (2013.01); *F05D 2250/294* (2013.01); *H02K 2213/03* (2013.01)

(56) References Cited

U.S. PATENT DOCUMENTS

| 2009/0127946 A1 | 5/2009 | Fee et al. |
| 2010/0001597 A1 | 1/2010 | Noll |
| 2015/0308456 A1 | 10/2015 | Thompson et al. |
| 2015/0337850 A1 | 11/2015 | An et al. |
| 2017/0274728 A1* | 9/2017 | Suzuki ................ B60H 1/3223 |
| 2019/0115804 A1* | 4/2019 | Yamada ................ H02K 5/203 |

FOREIGN PATENT DOCUMENTS

| EP | 3112713 | 1/2017 |
| JP | 2008-527955 | 7/2008 |
| JP | 2009-017777 | 1/2009 |
| JP | 2009-515496 | 4/2009 |
| JP | 2011-010525 | 1/2011 |
| JP | 2011-015578 | 1/2011 |
| JP | 2015-178168 | 10/2015 |
| JP | 2015-209845 | 11/2015 |
| KR | 20170088588 | 8/2017 |
| WO | 2015/098328 | 7/2015 |

OTHER PUBLICATIONS

International Preliminary Report on Patentability with Written Opinion dated Jan. 7, 2021 for PCT/JP2019/012961.

* cited by examiner

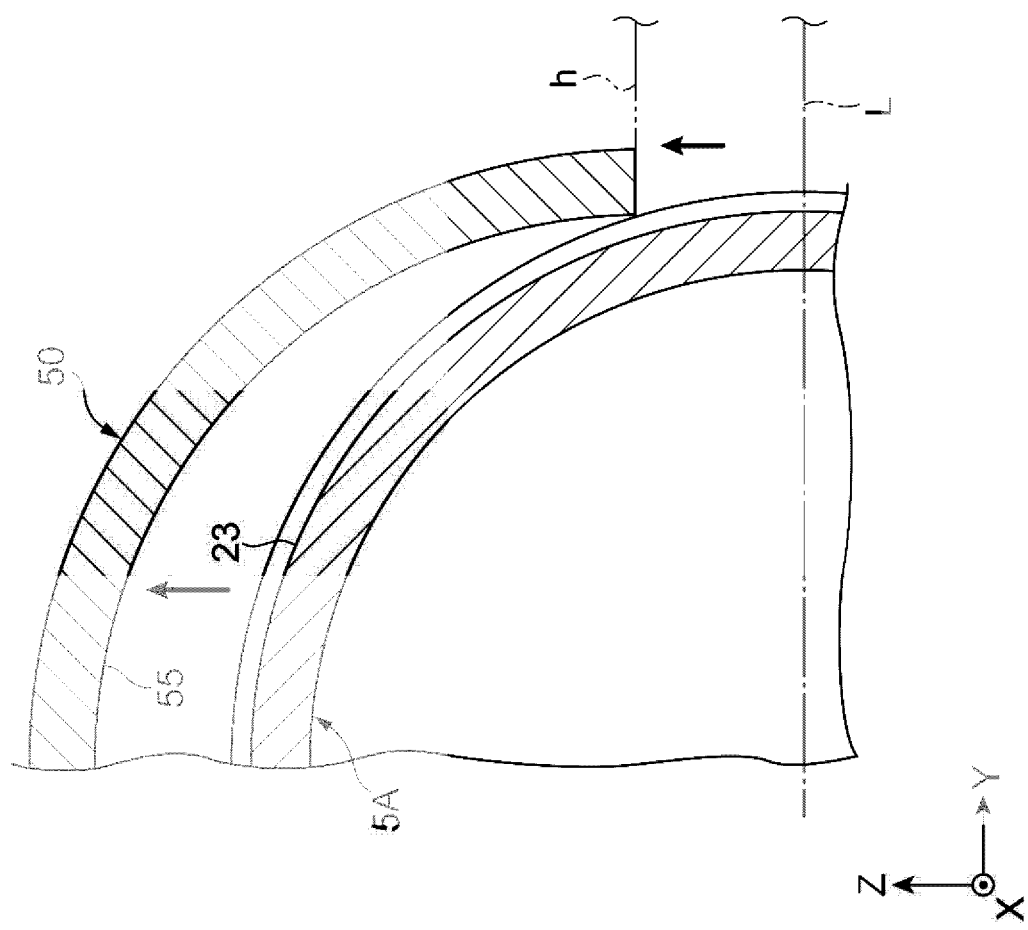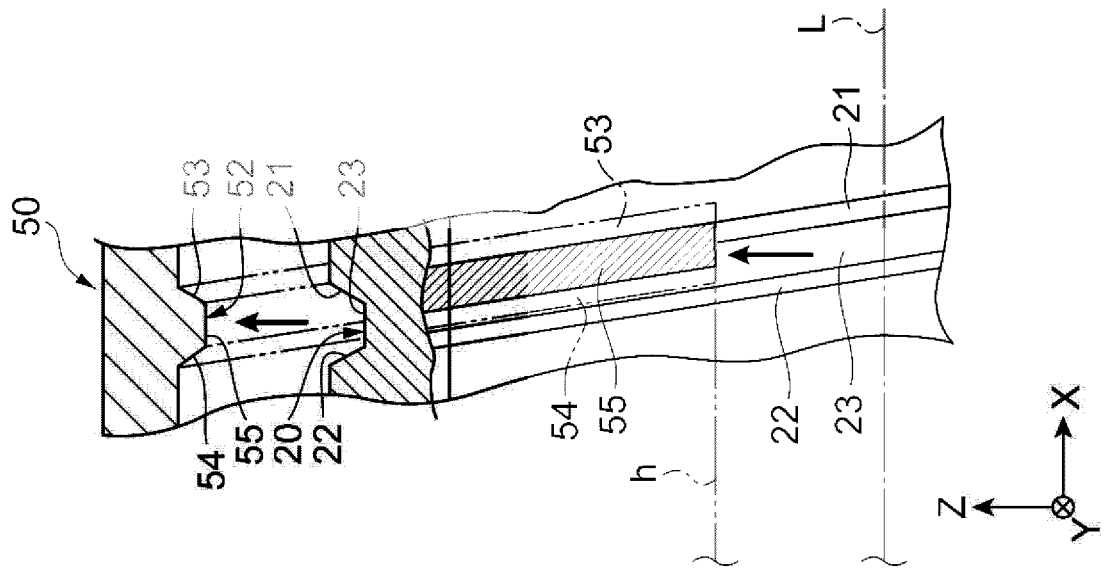

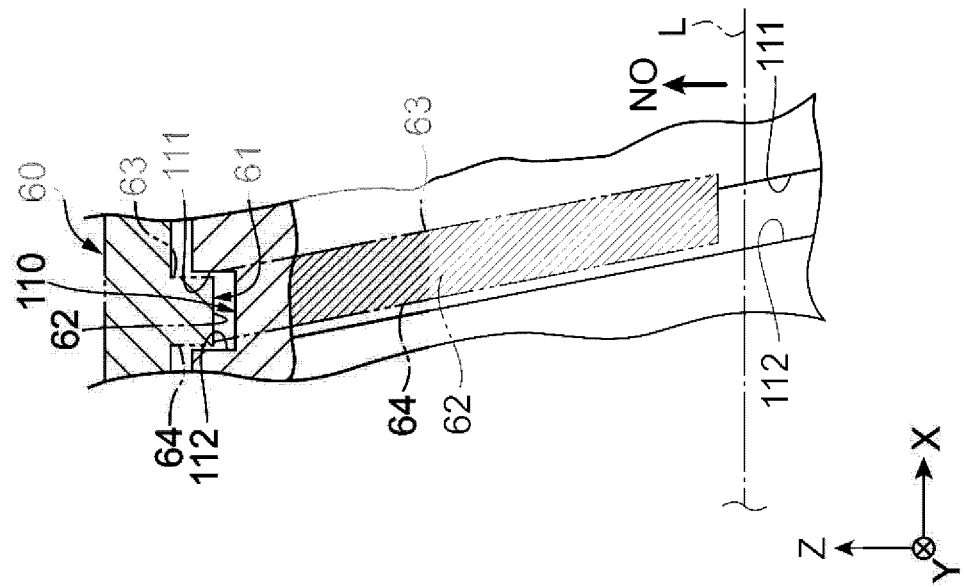
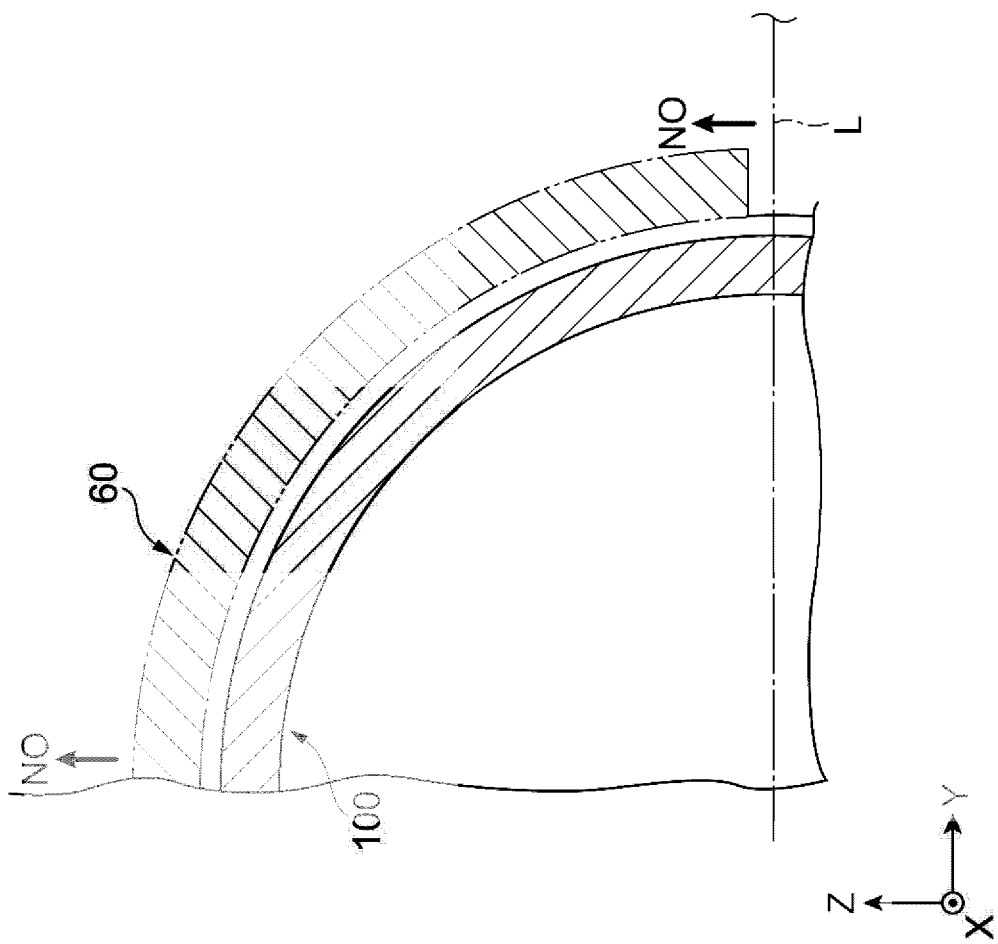

ROTARY MACHINE WITH COOLING JACKET INCLUDING HELICAL GROOVE

CROSS-REFERENCE TO RELATED APPLICATIONS

This application is a continuation application of PCT Application No. PCT/JP2019/012961, filed Mar. 26, 2019, which claims the benefit of priority from Japanese Patent Application No. 2018-122926, filed Jun. 28, 2018, the entire contents of which are incorporated herein by reference.

BACKGROUND

Japanese Unexamined Patent Publication No. 2011-10525 describes a motor case. This motor case includes a cylindrical outer member and a cylindrical inner member that is disposed inside the outer member. The inner member has, on an outer circumferential surface, a helical groove turning along a circumferential direction from one end of the inner member to the other end in an axial direction. This groove is formed on the outer circumferential surface of the inner member by a machining process. The inner member is press fitted into the outer member, so that an upper surface of the groove is blocked by an inner circumferential surface of the outer member to define a cooling passage.

SUMMARY

An example rotary machine disclosed herein includes a motor including a rotor and a stator, and a cooling jacket disposed around the stator. The cooling jacket includes an inner body part being cylindrical and in contact with the stator, an outer body part being cylindrical and surrounding the inner body part, and a helical groove through which a cooling medium passes, the groove circling helically around an outer circumference of the inner body part at least once. The groove has a pair of side surfaces opposed in a direction of an axis of rotation of the rotor, and a bottom surface connected to each of the side surfaces. Each of the side surfaces is formed having a draft angle inclined away from each other, the draft angle determined relative to a release direction orthogonal to the axis of rotation. The inner body part is cylindrical, and has a virtual region being cylindrical about the axis of rotation and including the bottom surface in an outer circumferential surface. The groove circles around the outer circumference of the inner body part a plurality of times, and the draft is derived using formula (1) under the condition of formula (2), where S is the draft angle, D1 is an outer diameter of the inner body part, D2 is an outer diameter of the virtual region, P is an array pitch of the groove in the direction of the axis of rotation, and B is a width of the bottom surface in the direction of the axis of rotation. It should be noted that "atan" means arctan and "acos" means arccos in the description below.

[Formula 1]

$$\frac{\mathrm{atan}\left[\frac{(D1-D2)/2\tan S}{D1/2\sin\{\mathrm{acos}(D2/D1)\}}\right]}{\mathrm{atan}\left(\frac{P}{\pi D1}\right)} > 1 \quad (1)$$

[Formula 2]

$$(D1-D2)\tan S + B < P \quad (2)$$

Another example rotary machine disclosed herein also includes a motor including a rotor and a stator, and a cooling jacket disposed around the stator. The cooling jacket includes an inner body part being cylindrical and in contact with the stator, an outer body part being cylindrical and surrounding the inner body part, and a helical groove through which a cooling medium passes, the groove circling helically around an outer circumference of the inner body part at least once. The groove has a pair of side surfaces opposed in a direction of an axis of rotation of the rotor, and a bottom surface connected to each of the side surfaces, and wherein, of the pair of side surfaces, at least the side surface that forms an undercut relative to a release direction orthogonal to the axis of rotation is formed having a draft.

Yet another example rotary machine disclosed herein similarly includes a motor including a rotor and a stator, and a cooling jacket disposed around the stator. The cooling jacket includes an inner body part being cylindrical and in contact with the stator, an outer body part being cylindrical and surrounding the inner body part, and a helical groove through which a cooling medium passes, the groove circling helically around an outer circumference of the inner body part at least once. The groove has a pair of side surfaces opposed in a direction of an axis of rotation of the rotor. Each of the side surfaces is inclined away from each other. The inner body part is cylindrical, and has a virtual region being cylindrical about the axis of rotation and including the bottom surface in an outer circumferential surface. The groove circles around the outer circumference of the inner body part a plurality of times, and a draft of each of the side surfaces is derived using formula (1) under the condition of formula (3), where S is the draft angle, D1 is an outer diameter of the inner body part, D2 is an outer diameter of the virtual region, and P is an array pitch of the groove in the direction of the axis of rotation.

[Formula 1]

$$\frac{\mathrm{atan}\left[\frac{(D1-D2)/2\tan S}{D1/2\sin\{\mathrm{acos}(D2/D1)\}}\right]}{\mathrm{atan}\left(\frac{P}{\pi D1}\right)} > 1 \quad (1)$$

[Formula 3]

$$(D1-D2)\tan S < P \quad (3)$$

An example method for manufacturing an inner body part of a rotary machine is disclosed herein. The rotary machine includes a motor including a rotor and a stator, and a cooling jacket disposed around the stator, wherein the cooling jacket includes the inner body part being cylindrical and in contact with the stator, an outer body part being cylindrical and surrounding the inner body part, and a helical groove through which a cooling medium passes. Additionally, the groove circles helically around an outer circumference of the inner body part at least once, wherein the groove includes a pair of side surfaces opposed in a direction of an axis of rotation of the rotor, and a bottom surface is connected to each of the pair of side surfaces. Each of the side surfaces is famed having a draft angle inclined in a direction opposite each other, the draft angle inclined relative to a release direction orthogonal to the axis of rotation. The method includes clamping a mold, filling an inner cavity with molten metal, solidifying the molten metal, and then separating the mold in the release direction being opposite directions relative to the axis of rotation to mold the inner body part.

Another example method for manufacturing an inner body part of a rotary machine including a motor is disclosed herein. The motor includes a rotor and a stator, and a cooling jacket is disposed around the stator. The cooling jacket includes the inner body part being cylindrical and in contact with the stator, an outer body part being cylindrical and surrounding the inner body part, and a helical groove through which a cooling medium passes. Additionally, the groove circles helically around an outer circumference of the inner body part at least once, wherein the groove has a pair of side surfaces opposed in a direction of an axis of rotation of the rotor, and a bottom surface connected to each of the side surfaces, and wherein, of the pair of side surfaces, at least the side that forms an undercut relative to a release direction orthogonal to the axis of rotation is formed having a draft. The method includes clamping a mold, filling an inner cavity with molten metal, solidifying the molten metal, and then separating the mold in the release direction being opposite directions relative to the axis of rotation to mold the inner body part.

Yet another example method for manufacturing an inner body part of a rotary machine is disclosed herein. The rotary machine includes a motor including a rotor and a stator, and a cooling jacket disposed around the stator, wherein the cooling jacket includes the inner body part being cylindrical and in contact with the stator, an outer body part being cylindrical and surrounding the inner body part, and a helical groove through which a cooling medium passes. Additionally, the groove circles helically around an outer circumference of the inner body part at least once, wherein the groove includes a pair of side surfaces opposed in a direction of an axis of rotation of the rotor, and wherein each of the side surfaces is inclined away from each other. The method includes clamping a mold, filling an inner cavity with molten metal, solidifying the molten metal, and then separating the mold in opposite directions relative to the axis of rotation to mold the inner body part.

BRIEF DESCRIPTION OF DRAWINGS

FIG. 6A is a cross-sectional view showing the inner body part separated from a die.

FIG. 6B is a partial cross-sectional side view, partly cut away, showing the inner body part and the die in the state shown in FIG. 6A.

FIG. 9A is yet another diagram illustrating the inner body part shown in FIG. 7.

FIG. 9B is a further diagram illustrating the inner body part shown in FIG. 7.

DETAILED DESCRIPTION

Figure 1:
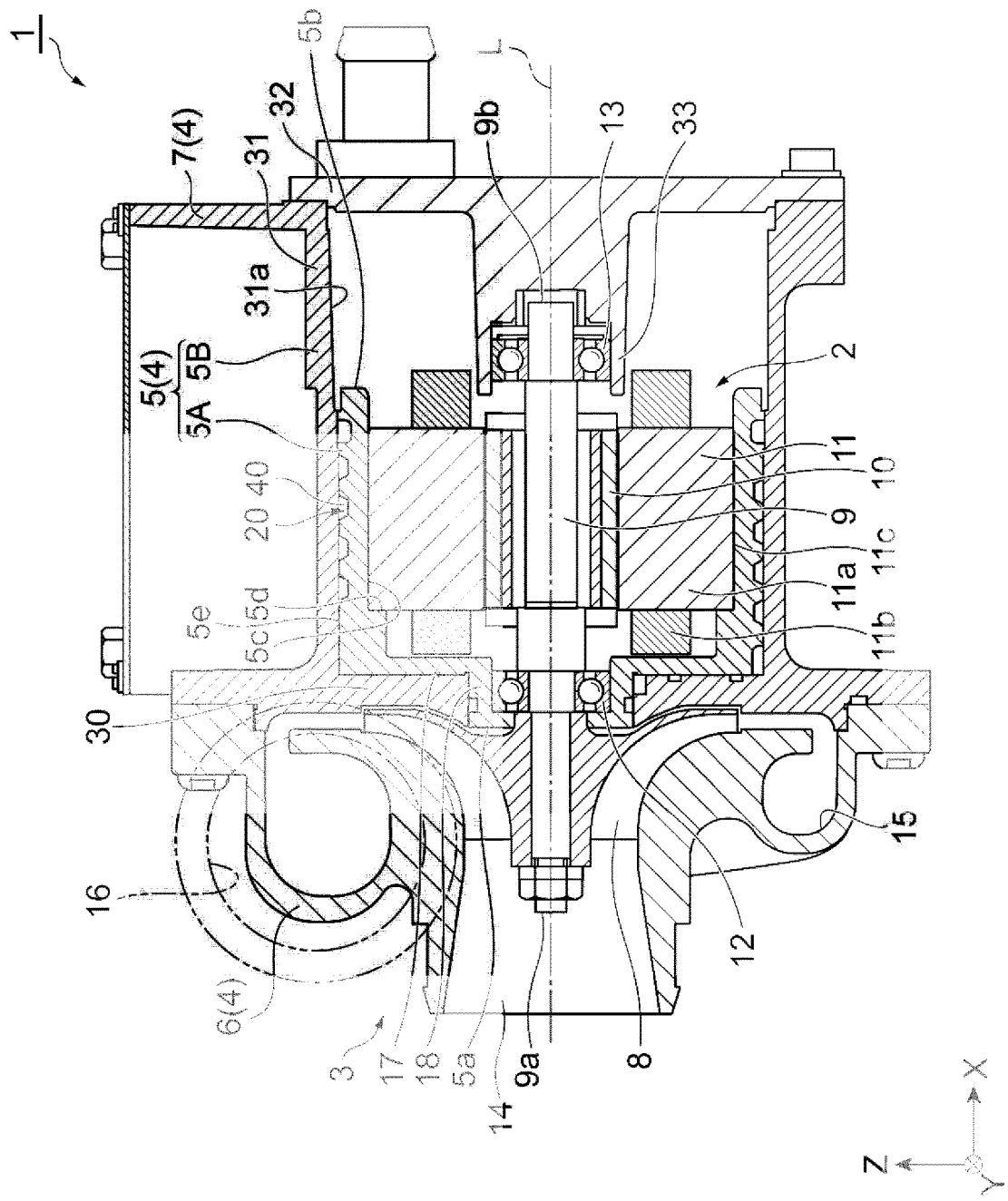
FIG. 1 is a side cross-sectional view of an example rotary machine.

An example rotary machine may include a motor including a rotor and a stator, and a cooling jacket disposed around the stator. The cooling jacket includes an inner body part being cylindrical and in contact with the stator, an outer body part being cylindrical and surrounding the inner body part, and a helical groove through which a cooling medium passes, the groove circling helically around an outer circumference of the inner body part at least once. The groove has a pair of side surfaces opposed in a direction of an axis of rotation of the rotor, and a bottom surface connected to each of the pair of side surfaces. Each of the side surfaces is formed having a draft angle inclined in a direction opposite each other, the draft angle inclined relative to a release direction orthogonal to the axis of rotation. The inner body part is cylindrical, and has a virtual region being cylindrical about the axis of rotation and including the bottom surface in an outer circumferential surface, the groove circles around the outer circumference of the inner body part a plurality of times, and the draft is derived using formula (1) under the condition of formula (2), where S is the draft angle, D1 is an outer diameter of the inner body part, D2 is an outer diameter of the virtual region, P is an array pitch of the groove in the direction of the axis of rotation, and B is a width of the bottom surface in the direction of the axis of rotation.

[Formula 1]

$$\frac{\operatorname{atan}\left[\frac{(D1-D2)/2\tan S}{D1/2\sin\{\operatorname{acos}(D2/D1)\}}\right]}{\operatorname{atan}\left(\frac{P}{\pi D1}\right)} > 1 \qquad (1)$$

[Formula 2]

$$(D1-D2)\tan S + B < P \qquad (2)$$

In some examples, each of the side surfaces of the groove formed on the inner body part of the cooling jacket has the draft angle inclined in the direction opposite to each other, the draft angle inclined relative to the release direction orthogonal to the axis of rotation of the rotor. Thus, interference with the mold is prevented during removal of the mold from the inner body part along the release direction, when forming the inner body part using the mold. That is, each of the side surfaces is capable of avoiding forming an undercut relative to the mold. This facilitates the release of the inner body part from the mold. The example rotary machine described above thus facilitates the molding process of the inner body part using the mold.

Another example rotary machine may also include a motor including a rotor and a stator, and a cooling jacket disposed around the stator. The cooling jacket includes an inner body part being cylindrical and in contact with the stator, an outer body part being cylindrical and surrounding the inner body part, and a helical groove through which a cooling medium passes, the groove circling helically around an outer circumference of the inner body part at least once. The groove has a pair of side surfaces opposed in a direction of an axis of rotation of the rotor, and a bottom surface connected to each of the pair of side surfaces, and wherein, of the pair of side surfaces, at least the side surface that forms an undercut relative to a release direction orthogonal to the axis of rotation is formed having a draft.

In some examples, the pair of side surfaces can avoid forming the undercut relative to the mold. This facilitates the release of the inner body part from the mold and the molding process of the inner body part using the mold.

In some examples, the inner body part is cylindrical, and has a virtual region being cylindrical about the axis of rotation and including the bottom surface in an outer circumferential surface, and the groove circles around the outer circumference of the inner body part a plurality of times. Moreover, in this aspect, the draft is derived using formula (1) under the condition of formula (2), where S is the draft angle, D1 is an outer diameter of the inner body part, D2 is an outer diameter of the virtual region, P is an array pitch of the groove in the direction of the axis of rotation, and B is a width of the bottom surface in the direction of the axis of rotation. Accordingly, the inner body part can be reliably released from the mold when forming the inner body part by the molding process.

[Formula 1]

$$\frac{\operatorname{atan}\left[\frac{(D1-D2)/2\tan S}{D1/2\sin\{\operatorname{acos}(D2/D1)\}}\right]}{\operatorname{atan}\left(\frac{P}{\pi D1}\right)} > 1 \quad (1)$$

[Formula 2]

$$(D1-D2)\tan S + B < P \quad (2)$$

Yet another example rotary machine may similarly include a motor including a rotor and a stator, and a cooling jacket disposed around the stator. The cooling jacket includes an inner body part being cylindrical and in contact with the stator, an outer body part being cylindrical and surrounding the inner body part, and a helical groove through which a cooling medium passes, the groove circling helically around an outer circumference of the inner body part at least once. The groove has a pair of side surfaces opposed in a direction of an axis of rotation of the rotor, and wherein each of the pair of side surfaces is inclined in a direction opposite each other. The inner body part is cylindrical, and has a virtual region being cylindrical about the axis of rotation and including the bottom surface in an outer circumferential surface, and the groove circles around the outer circumference of the inner body part a plurality of times. Moreover, in this aspect, the draft is derived using formula (1) under the condition of formula (3), where S is the draft angle, D1 is an outer diameter of the inner body part, D2 is an outer diameter of the virtual region, and P is an array pitch of the groove in the direction of the axis of rotation. Accordingly, the inner body part can be reliably released from the mold when forming the inner body part by the forming process.

[Formula 1]

$$\frac{\operatorname{atan}\left[\frac{(D1-D2)/2\tan S}{D1/2\sin\{\operatorname{acos}(D2/D1)\}}\right]}{\operatorname{atan}\left(\frac{P}{\pi D1}\right)} > 1 \quad (1)$$

[Formula 3]

$$(D1-D2)\tan S < P \quad (3)$$

In some examples, each of the side surfaces of the groove is inclined in the direction opposite to each other, and has the draft angle formed as a result. This facilitates the release of the inner body part from the mold and the molding process of the inner body part using the mold.

An example method for manufacturing an inner body part of a rotary machine including a motor is disclosed herein. The motor includes a rotor and a stator, and a cooling jacket is disposed around the stator, wherein the cooling jacket includes the inner body part being cylindrical and in contact with the stator, an outer body part being cylindrical and surrounding the inner body part, and a helical groove through which a cooling medium passes. Additionally, the groove circles helically around an outer circumference of the inner body part at least once, wherein the groove includes a pair of side surfaces opposed in a direction of an axis of rotation of the rotor, and a bottom surface connected to each of the pair of side surfaces, and wherein each of the side surfaces is formed having a draft angle inclined in a direction opposite each other, the draft angle inclined relative to a release direction orthogonal to the axis of rotation. The method includes clamping a mold, filling an inner cavity with molten metal, solidifying the molten metal, and then separating the mold in the release direction being opposite directions relative to the axis of rotation to mold the inner body part.

Another example method for manufacturing an inner body part of a rotary machine is disclosed herein. The rotary machine comprises a motor including a rotor and a stator, and a cooling jacket disposed around the stator, wherein the cooling jacket includes the inner body part being cylindrical and in contact with the stator, an outer body part being cylindrical and surrounding the inner body part, and a helical groove through which a cooling medium passes. Additionally, the groove circles helically around an outer circumference of the inner body part at least once, wherein the groove has a pair of side surfaces opposed in a direction of an axis of rotation of the rotor, and a bottom surface connected to each of the side surfaces, and wherein, of the pair of side surfaces, at least the side that forms an undercut relative to a release direction orthogonal to the axis of rotation is formed having a draft. The method includes clamping a mold, filling an inner cavity with molten metal, solidifying the molten metal, and then separating the mold in the release direction being opposite directions relative to the axis of rotation to mold the inner body part.

Yet another example method for manufacturing an inner body part of a rotary machine including a motor is disclosed herein. The motor includes a rotor and a stator, and a cooling jacket disposed around the stator, wherein the cooling jacket includes the inner body part being cylindrical and in contact with the stator, an outer body part being cylindrical and surrounding the inner body part, and a helical groove through which a cooling medium passes. Additionally, the groove circles helically around an outer circumference of the inner body part at least once, wherein the groove includes a pair of side surfaces opposed in a direction of an axis of rotation of the rotor, and wherein each of the pair of side surfaces is inclined in a direction opposite each other. The method includes clamping a mold, filling an inner cavity with molten metal, solidifying the molten metal, and then separating the mold in opposite directions relative to the axis of rotation to mold the inner body part.

Hereinafter, with reference to the drawings, the same elements or similar elements having the same function are denoted by the same reference numerals, and redundant description will be omitted. Each drawing shows an XYZ orthogonal coordinate system. In the description below, a direction of an axis of rotation in which an axis of rotation L extends is called an X direction, a direction perpendicular to the X direction is called a Z direction, and a direction perpendicular to the X direction and the Z direction is called a Y direction. Moreover, in the description below, a release direction during release from a die 50 (see FIG. 5) is along the Z direction.

An example rotary machine 1 is illustrated in FIG. 1. In some examples, the rotary machine 1 may comprise an electric compressor. The rotary machine 1 may be configured to be used with, for example, an internal combustion engine of a vehicle or a ship. The rotary machine 1 includes an electric motor 2 which is a drive source, and a compressor (centrifugal compressor) 3 which is driven by the electric motor 2 to compress an inner fluid (for example, air). The rotary machine 1 also includes a housing 4, and the housing 4 includes a motor housing 5 (cooling jacket), a compressor housing 6, and an inverter housing 7.

The electric motor 2 includes a rotating shaft 9, a rotor 10 that is mounted on the rotating shaft 9, and a stator 11 that is disposed so as to surround the rotor 10. The rotating shaft 9 is rotatably supported by a pair of bearings 12, 13 (e.g., first and second bearings) held by the motor housing 5. Each of the bearings 12, 13 is disposed on a respective side of the stator 11 in the X direction.

A center portion of the rotating shaft 9 in the X direction is accommodated in the motor housing 5. An end of the rotating shaft 9 that is closer to the compressor 3 is a distal end portion 9*a* which projects in the X direction from the motor housing 5. The end opposite the distal end portion 9*a* of the rotating shaft 9 is a base end portion 9*b* which is accommodated inside the motor housing 5 and held by a lid portion 32.

The rotor 10 is fixed to the center portion of the rotating shaft 9 in the X direction. The rotor 10 includes one or a plurality of permanent magnets that is attached to the rotating shaft 9. The stator 11 is held by an inner surface of the motor housing 5 so as to surround the rotor 10.

The stator 11 is disposed around the rotor 10. The stator 11 includes a cylindrical core portion 11*a* that is disposed so as to surround the rotor 10, and a coil portion 11*b* that is formed by a conductive wire being wound around the core portion 11*a*. When an alternating current is passed through the coil portion 11*b* of the stator 11 through the conductive wire, the rotating shaft 9 rotates due to the interaction between the rotor 10 and the stator 11.

The compressor 3 includes the compressor housing 6, and a compressor impeller 8 that is accommodated inside the compressor housing 6. The compressor housing 6 is fixed to the motor housing 5. The compressor impeller 8 is disposed inside the compressor housing 6 by being attached to the distal end portion 9*a* of the rotating shaft 9.

The compressor housing 6 includes an inlet port 14, a scroll portion 15, and an outlet port 16. In the compressor housing 6, the compressor impeller 8 rotates when the rotating shaft 9 rotates as described above. Outside air is sucked into the compressor housing 6 through the inlet port 14 and is introduced into the compressor impeller 8. The air introduced into the compressor impeller 8 is compressed, passed through the scroll portion 15, and discharged from the outlet port 16. The compressed air discharged from the outlet port 16 is supplied to an internal combustion engine.

The motor housing 5 includes a cylindrical inner housing 5A (or other type of "inner body part") and a cylindrical outer housing 5B (or other type of "outer body part"). That is, the motor housing 5 has a structure that is divided into two bodies. The inner housing 5A is disposed on a side closer to the rotating shaft 9 than the outer housing 5B (inner side), and the outer housing 5B (or other type of "outer body part") is disposed on (surrounds) an outer circumferential side of the inner housing 5A (outer side). The inner housing 5A and the outer housing 5B are separate bodies and are concentrically disposed about the axis of rotation L. The inner housing 5A is attached to the outer housing 5B, for example, by an interference fit (a shrink fit or the like).

The same or different materials may be used for the inner housing 5A and the outer housing 5B, such as aluminum or cast iron. Moreover, the inner housing 5A and the outer housing 5B are formed by a molding process using a mold such as die casting or sand casting.

The inner housing 5A surrounds and holds the stator 11. The stator 11 is attached to the inner housing 5A, for example, by a shrink fit or a press fit. The inner housing 5A and the stator 11 are thus unitized. The outer housing 5B surrounds and holds the inner housing 5A. The unitized inner housing 5A and stator 11 are attached to the outer housing 5B, for example, by an interference fit (a shrink fit or the like).

The inner housing 5A has one end portion 5*a* (first end portion) that is closer to the compressor impeller 8 in the X direction, and another end portion 5*b* (second end portion) on an opposite side. In the vicinity of the one end portion 5*a* of the inner housing 5A, an annular cover portion 17 that faces a coil end of the stator 11 and a tubular bearing holding portion 18 that holds the bearing 12 supporting the rotating shaft 9 are formed.

The other end portion 5b of the inner housing 5A is open in the X direction. An inner circumferential surface 5*c* of the inner housing 5A is in contact with or in close proximity to an outer circumferential surface 11*c* of the stator 11. The inner circumferential surface 5*c* also has a stepped portion 5*d* that locks the stator 11. The stepped portion 5*d* is in contact with an end of the core portion 11*a* of the stator 11 closer to the compressor 3 in the X direction.

To mount the stator 11 in the inner housing 5A, the stator 11 is pushed in from an opening formed at the other end portion 5*b* of the inner housing 5A, and the core portion 11*a* of the stator 11 is brought into contact with the stepped portion 5*d*. This enables the stator 11 to be positioned relative to the inner housing 5A in the X direction. It should be noted that a structure in which the inner circumferential surface 5*c* does not have the stepped portion 5*d* is also possible. The inner housing 5A has a helical groove 20 formed on an outer circumferential surface 5*e*.

The outer housing 5B includes an annular base portion 30 that is in contact with the cover portion 17 and the bearing holding portion 18 of the inner housing 5A and is fixed to the compressor housing 6, a cylindrical body portion 31 that projects from the base portion 30 and extends in the X direction, and a lid portion 32 that is mounted on the body portion 31. The body portion 31 surrounds and holds the inner housing 5A. The body portion 31 has an opening opposite the base portion 30, and the lid portion 32 is disposed so as to block the opening.

The lid portion 32 has a cylindrical bearing holding portion 33. The bearing holding portion 33 projects toward the compressor 3 along the X direction. That is, a distal end of the bearing holding portion 33 projects so as to be closer to the compressor 3 than a body portion of the lid portion 32. The bearing holding portion 33 is disposed, for example, outside the inner housing 5A (a region that does not overlap with the inner housing 5A in the X direction). It should be noted that the bearing holding portion 33 may be disposed to reach inside the inner housing 5A. The bearing holding portion 33 holds the bearing 13.

The inner housing 5A is fitted inside the body portion 31 as described above, and an inner circumferential surface 31a of the body portion 31 is in close contact with the outer circumferential surface 5e of the inner housing 5A. The groove 20 formed on the outer circumferential surface 5e is thus blocked by the inner circumferential surface 31a to thereby define a cooling passage 40. A cooling medium such as cooling water is flowed through the cooling passage 40, and the stator 11 and the like are cooled by the cooling medium.

The inverter housing 7 is an inverter accommodating portion that accommodates an inverter (not shown). The inverter controls the alternating current supplied to the coil portion 11b of the stator 11. The inverter housing 7 is disposed, for example, outside the outer housing 5B in a radial direction of the axis of rotation L. The inverter housing 7 is box-shaped and is integrally formed with the outer housing 5B. It should be noted that the radial direction of the axis of rotation L means a direction orthogonal to the direction of the axis of rotation.

Figure 2:
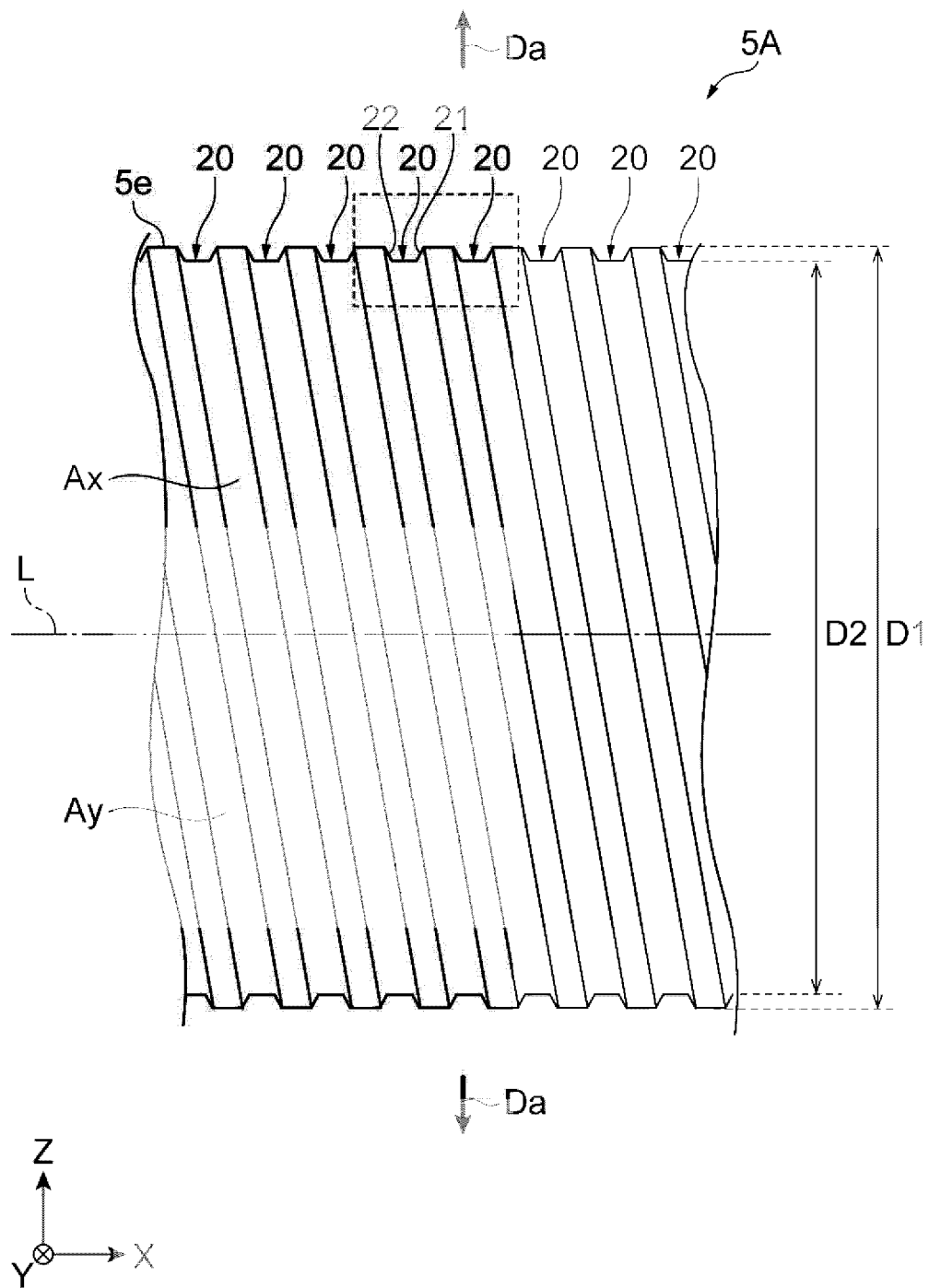
FIG. 2 is a side view of an inner body part shown in FIG. 1.

Additional details of the groove 20 mentioned above will now be described. As shown in FIG. 2, the groove 20 is formed so as to circle helically about the axis of rotation L at least once on the outer circumferential surface 5e of the inner housing 5A. In some examples, the groove 20 circles around the outer circumferential surface 5e a plurality of times. In some examples, although the groove 20 forms one continuous cooling passage 40, a plurality of the grooves 20 may be substantially arranged side by side along the X direction in an XZ cross-section including the axis of rotation L. In one example, the grooves 20 are arranged in parallel at regular intervals along the X direction in the XZ plane.

The groove 20 is also inclined relative to the Z direction when seen from the Y direction in FIG. 2. For purposes of illustration, the inner housing 5A is divided into a first region Ax and a second region Ay. Taking the axis of rotation L as the center, the first region Ax is a region on one side in the Z direction (upper half in FIG. 2). The groove 20 in the first region Ax inclines from the right toward the left in FIG. 2, so as to be offset, as the distance increases in the Z direction from the axis of rotation L. When seen from the Y direction, the groove 20 in the first region Ax is inclined so as to be positioned toward the one end portion 5a (see FIG. 1) of the inner housing 5A in the X direction as the distance increases in the Z direction from a position overlapping the axis of rotation L. It should be noted that for the groove 20 in the first region Ax, with the axis of rotation L as the center, the direction that is the same as the Z direction is a release direction Da of the die 50 (see FIG. 5).

Taking the axis of rotation L as the center, the second region Ay is a region on the other side in the Z direction (lower half in FIG. 2). The groove 20 in the second region Ay inclines from the left toward the right in FIG. 2, so as to be offset, as the distance increases in the Z direction from the axis of rotation L. When seen from the Y direction, the groove 20 in the second region Ay is inclined so as to be positioned toward the other end portion 5b (see FIG. 1) of the inner housing 5A in the X direction as the distance increases in the Z direction from a position overlapping the axis of rotation L. It should be noted that for the groove 20 in the second region Ay, with the axis of rotation L as the center, the direction opposite the Z direction is the release direction Da of the die 50. The inclination angle (oblique angle H, FIG. 3) of the groove 20 is greater than 0° relative to the Z direction when seen from the Y direction in FIG. 2. The value of the oblique angle H of the groove 20 is, for example, about 1.0°, but is not limited thereto, and can be varied as appropriate.

Figure 3:
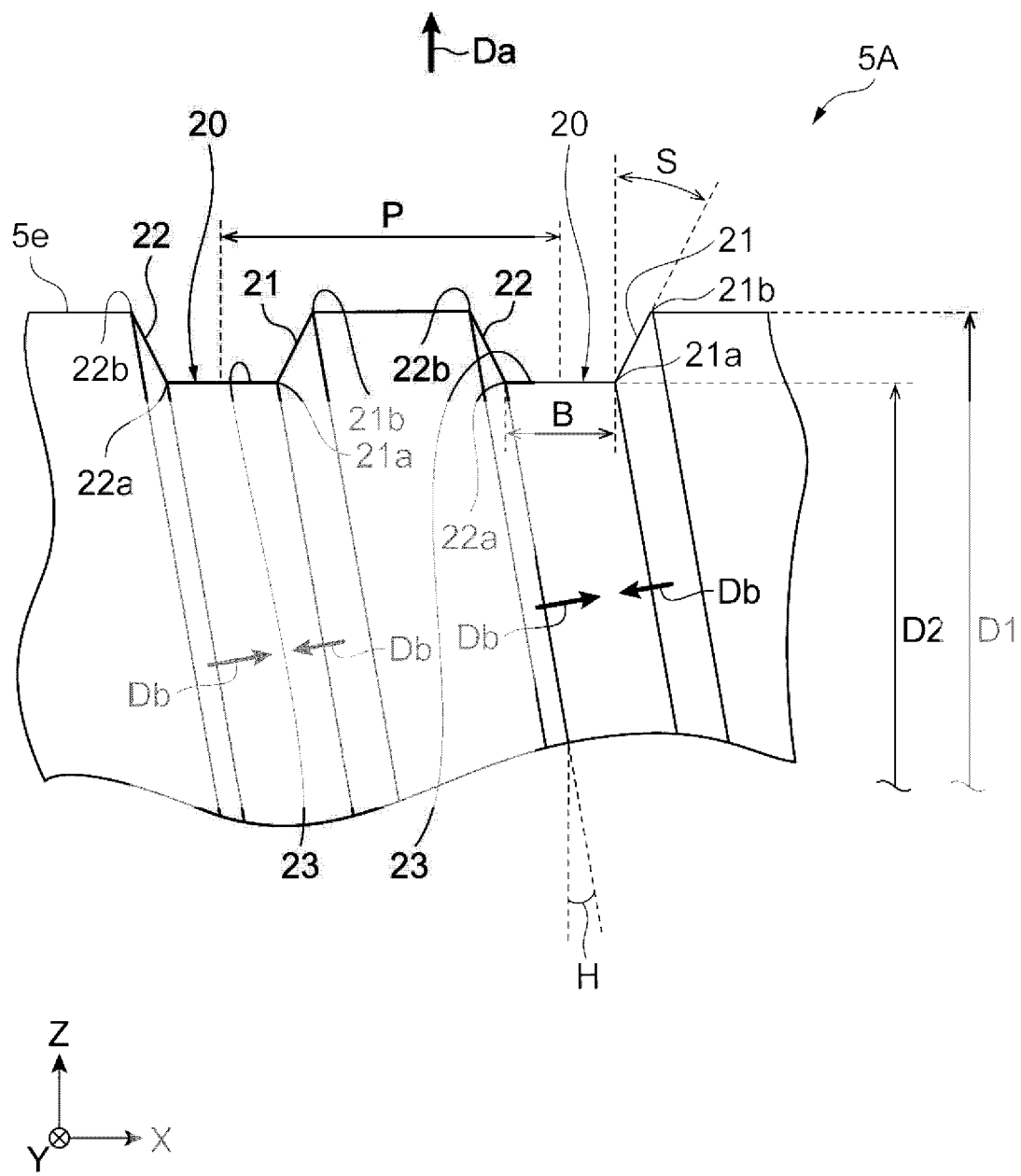
FIG. 3 is an enlarged side view showing an enlarged portion of a helical groove formed on the inner body part shown in FIG. 2.

FIG. 3 shows the broken line portion in FIG. 2 enlarged. As shown in FIG. 3, the groove 20 includes a pair of side surfaces 21, 22 opposed in the X direction, and a bottom surface 23 that is connected to each of the side surfaces 21, 22. Additionally, each side surface extends from the bottom surface 23 to the outer circumferential surface 5e. Each of the side surfaces 21, 22 is formed having a draft angle S that is inclined in a direction opposite each other, the draft angle S determined relative to the Z direction. The opposing direction Db of the side surface 21 is a direction toward the side surface 22, and the opposing direction Dc of the side surface 22 is a direction toward the side surface 21.

The side surfaces 21, 22 are inclined away from each other, and as a result, the distance between the side surfaces 21, 22 at the outer circumferential surface 5e is greater than the distance between the side surfaces at the bottom surface 23. It should be noted that if the draft angles S were not provided, the side surface 21 would correspond to the side surface that would form an undercut U (see FIG. 8B) in the first region Ax, and the side surface 22 would correspond to the side surface that would form the undercut U in the second region Ay. The undercut U is a portion that interferes with the die during demolding.

In some examples, the one side surface 21 (a first side surface) of the pair of side surfaces 21, 22 is positioned closer to the other end portion 5b (see FIG. 1) of the inner housing 5A in the X direction than the other side surface 22 (a second side surface). Moreover, the one side surface 21 is formed having the draft angle S that is inclined toward the other end portion 5b in the X direction (away from the other side surface 22) relative to the Z direction. In other words, as shown in FIG. 3, the one side surface 21 has a base end 21a which is one end in the Z direction and a distal end 21b which is the opposite other end. The base end 21a is the portion connected to the bottom surface 23 and is positioned closer to the axis of rotation L (see FIGS. 1 and 2) than the distal end 21b. The side surface 21 is inclined so that the distal end 21b is positioned closer to the other end portion 5b (see FIG. 1) of the inner housing 5A than the base end 21a.

The other side surface 22 is positioned closer to the one end portion 5a (see FIG. 1) of the inner housing 5A in the X direction than the one side surface 21. Moreover, the other side surface 22 is formed having the draft angle S that is inclined toward the one end portion 5a in the X direction (away from the other side surface 21) relative to the Z direction. In other words, as shown in FIG. 3, the other side surface 22 has a base end 22a which is one end in the Z direction and a distal end 22b which is the opposite other end. The base end 22a is the portion connected to the bottom surface 23 and is positioned closer to the axis of rotation L (see FIGS. 1 and 2) than the distal end 22b. The side surface 22 is inclined so that the distal end 22b is positioned closer to the one end portion 5a (see FIG. 1) of the inner housing 5A than the base end 22a.

In the side surfaces 21, 22, the draft angles S indicate the inclination angles of the side surfaces 21, 22 relative to the Z direction when seen from the Y direction, and have a value greater than 0°. The draft angles S of the side surfaces 21, 22 may be the same or may be different from one another. An example illustrates a case in which the draft angles S of the side surfaces 21, 22 are the same.

The draft angle S of the side surfaces 21, 22 are derived, for example, using formulas (1) and (2) below. In formulas (1) and (2), P is an array pitch of the groove 20 in the X direction, D1 is an outer diameter of the inner housing 5A, and D2 is an outer diameter of a virtual region of the inner housing 5A, the virtual region including the bottom surface 23 in the outer circumferential surface and being cylindrical about the axis of rotation L. In some examples, the outer diameter D1 may be referred to as a "major diameter" of the inner housing 5A, and the outer diameter D2 may be referred to as a "minor diameter" of the inner housing 5A. In formula (2), B is a width of the bottom surface 23 in the X direction. It should be noted that the outer diameters D1 and D2 are shown in FIGS. 2 and 3, and the array pitch P, the width B, and the draft angle S are shown in FIG. 3. Moreover, in a case in which the width B of the bottom surface 23 need not be considered for the groove 20 (see FIG. 10), the draft angle S can also be derived using formulas (1) and (3) below. Formula (3) below is formula (2) without the width B.

[Formula 1]

$$\frac{\mathrm{atan}\left[\frac{(D1-D2)/2\tan S}{D1/2\sin\{\mathrm{acos}(D2/D1)\}}\right]}{\mathrm{atan}\left(\frac{P}{\pi D1}\right)} > 1 \quad (1)$$

[Formula 2]

$$(D1-D2)\tan S + B < P \quad (2)$$

[Formula 3]

$$(D1-D2)\tan S < P \quad (3)$$

Figure 4:
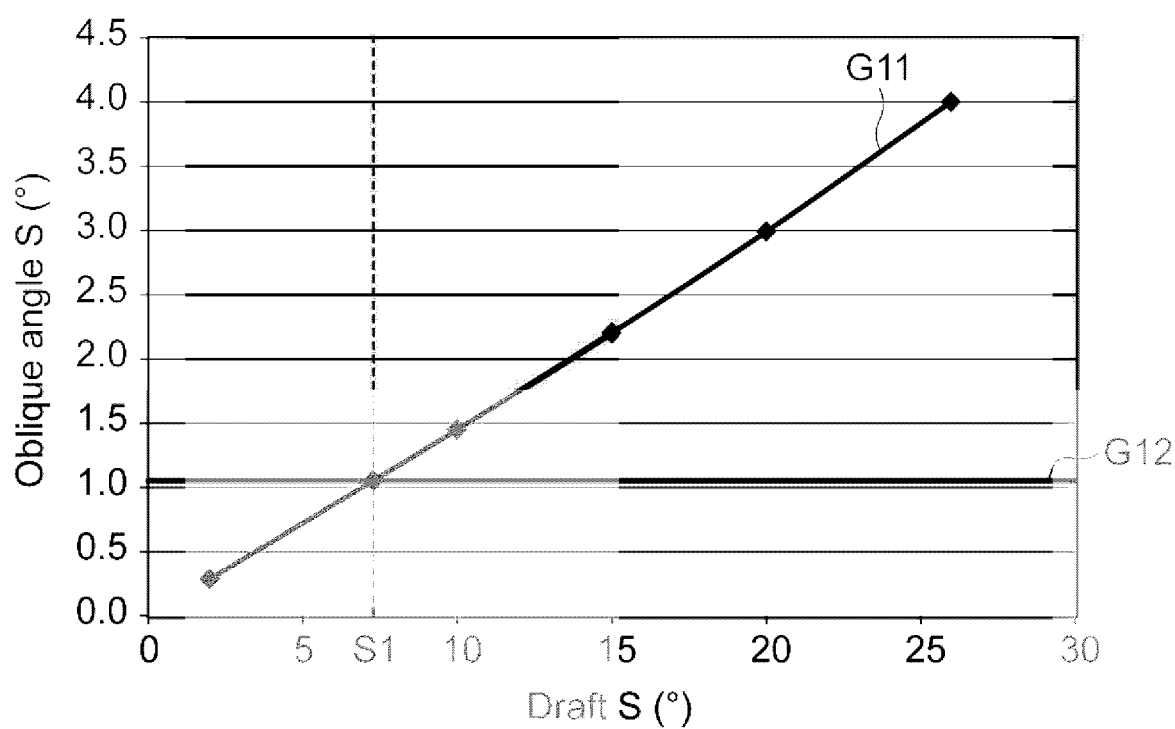
FIG. 4 is a graph showing the relationship between an oblique angle of the groove and a draft of side surfaces of the groove.

FIG. 4 illustrates an example graph showing the relationship between the draft angle S of the side surfaces 21, 22 and the oblique angle H of the groove 20. In FIG. 4, the vertical axis shows the oblique angle H (°) of the groove 20, and the horizontal axis shows the draft angle S (°). A lower limit of the draft angle S of the groove 20 having a predetermined oblique angle H to ensure reliable demolding during the molding process is derived so as to satisfy formula (1) under the condition of formula (2). It should be noted that if the width B of the bottom surface 23 need not be considered for the groove 20, the lower limit of the draft angle S can be derived so as to satisfy formula (1) under the condition of formula (3). In FIG. 4, the lower limits of the draft angle S are represented by graph G11. In some examples, the graph G11 can also be perceived as upper limits of the oblique angle H of the groove 20 having a predetermined draft angle S to ensure reliable demolding during the molding process. Moreover, the graph G11 is the relationship between the draft angle S and the oblique angle H of the groove 20 that is calculated when the array pitch P of the groove 20 is 7.6 mm, the outer diameter D1 is 79.2 mm, the outer diameter D2 is 76 mm, and the width B is 4 mm.

As shown in FIG. 4, the oblique angle H of the groove 20 and the lower limit of the draft angle S (graph G11) are in a proportional relationship. The oblique angle H of an example groove 20 is about 1° (graph G12), and an intersection point S1 of the graphs G11 and G12 is about 7°, the intersection point S1 being the lower limit of the draft angle S. Accordingly, the 7° draft angle S is equal to about seven times the 1° oblique angle H. By way of further example with reference to FIG. 4, it can be seen that the graph G11 may include the additional intersections of: a 10° draft angle S at a 1.5° oblique angle H, and a 20° draft angle S at a 3.0° oblique angle H, from which it may be understood that the draft angle S is approximately 6.67 times greater than the oblique angle H at these points of intersection. In some examples, when the draft angle S is greater than the intersection point S1, reliable demolding during the molding process is ensured without the side surface 21 or the side surface 22 of the groove 20 forming an undercut U (see FIG. 8B). Accordingly, setting the draft angle S to satisfy formulas (1) and (2) ensures reliable demolding during the molding process. In some examples, the draft angle S may be set equal to or greater than approximately seven times the oblique angle H to facilitate reliable demolding. Additionally, the term "approximately seven" may be understood to include a value of 6.67, as illustrated in FIG. 4 and discussed in further detail above.

As mentioned above, in the production of the inner housing 5A, the inner housing 5A is formed by a molding process using a mold such as die casting. An example molding process method of the inner housing 5A will now be described. A case in which the inner housing 5A is molded by die casting using a die is shown by way of example.

Figure 5:
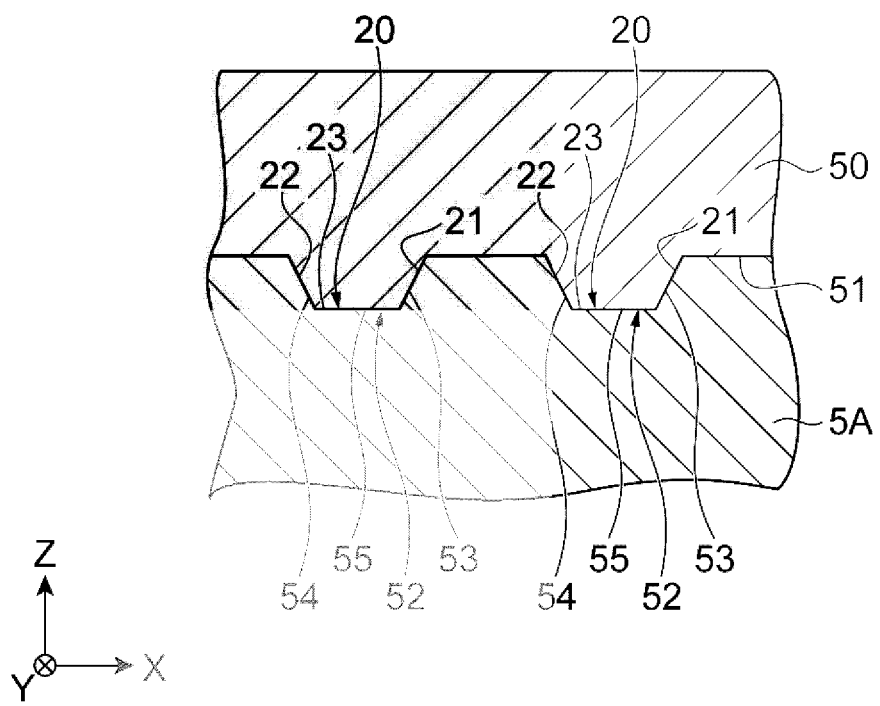
FIG. 5 is a diagram showing a manufacturing process of the inner body part.

First, the die 50 shown in FIG. 5 is prepared. The die 50 corresponds to the inner housing 5A. It should be noted that FIG. 5 shows an XZ cross-sectional view including the axis of rotation L (see FIGS. 1 and 2). The die 50 includes a die that is positioned above an XY plane (die parting plane) including the axis of rotation L and a die positioned below the same. The upper die and the lower die are joined together during clamping. During demolding, the upper die and the lower die are configured to separate in opposite directions relative to the axis of rotation L, that is, directions orthogonal to the axis of rotation L and opposite to one another. The die 50 includes, on an inner surface 51, a projecting portion 52 that corresponds to the shape of the groove 20. The projecting portion 52 has a pair of side surfaces 53, 54 opposed in the X direction, and a top surface 55 that is connected to each of the pair of side surfaces 53, 54.

The pair of side surfaces 53, 54 are respectively formed along the pair of side surfaces 21, 22 of the groove 20. That is, each of the pair of side surfaces 53, 54 is formed having a slope inclined away from each other (see FIG. 3), the angle of the slope relative to the Z direction. In some examples, the one side surface 53 of the pair of side surfaces 53, 54 positioned toward the other end portion 5b (see FIG. 1) of the inner housing 5A in the X direction is formed having a slope inclined toward the other end portion 5b in the X direction relative to the Z direction.

The one side surface 54 of the pair of side surfaces 53, 54 positioned toward the one end portion 5a (see FIG. 1) of the inner housing 5A in the X direction is formed having a slope inclined toward the one end portion 5a in the X direction relative to the Z direction. The slopes of the side surfaces 53, 54 are, for example, the same as the draft angles S of the side surfaces 21, 22.

Next, the upper die and the lower die of the die 50 are clamped, and an inner cavity of the die 50 is filled with a molten metal material. The metal material filling the inner cavity may be aluminum, cast iron or other suitable metal material. The metal material is then cooled for a predetermined time period and hardened inside the die 50. The inner housing 5A is thus obtained as shown in FIG. 5. The upper die and the lower die of the die 50 are then separated (unclamped) in the release direction along the Z direction.

The separation of the die 50 will now be described in further detail with reference to FIGS. 6A and 6B. FIG. 6A is a schematic cross-sectional view of the inner housing 5A and the die 50 seen from the X direction, and FIG. 6B is a schematic cross-sectional view of the inner housing 5A and the die 50 seen from the Y direction, corresponding to FIG. 6A. For ease of explanation, in FIG. 6B, the top surface 55 of the projecting portion 52 of the die 50 is shown hatched and the pair of side surfaces 53, 54 are shown in two-dot chain lines.

As shown in FIG. 6A, if the die 50 does not interfere with the inner housing 5A before the die 50 moves to a height h from a height of the axis of rotation L (position at which the die 50 is clamped), the die 50 can be separated from the inner housing 5A. The die 50 has the pair of side surfaces 53, 54 which form the draft angles S in the groove 20 of the inner housing 5A. The groove 20 circles helically while being inclined relative to the release direction of the die 50. As shown in FIG. 6B, when the die 50 is moved in the release direction, the projecting portion 52 (top surface 55) of the die 50 shifts in the X direction relative to the groove 20, except in a portion that forms a top portion (upper end portion of FIG. 6B) in the release direction of the groove 20. However, since the groove 20 according to an example has the draft angles S, interference between the die 50 and the inner housing 5A can be avoided, not only at the top portion in the release direction, but also along the entire circumference, and the die 50 can be appropriately separated from the inner housing 5A. As a result, the inner housing 5A can be easily and efficiently manufactured by the molding process using the die 50.

The example rotary machine 1 will now be further described with reference to a comparative example.

Figure 7:
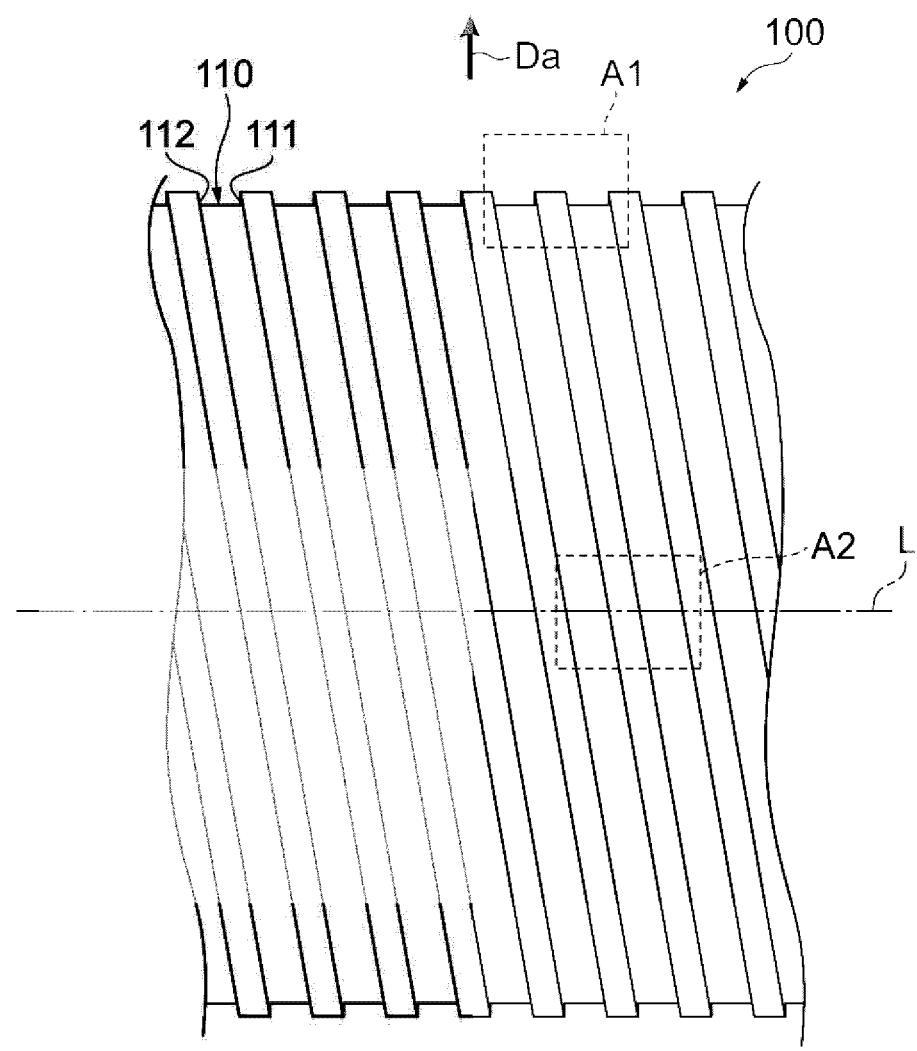
FIG. 7 is a side view showing an inner body part as a comparative example.
Figure 8A:
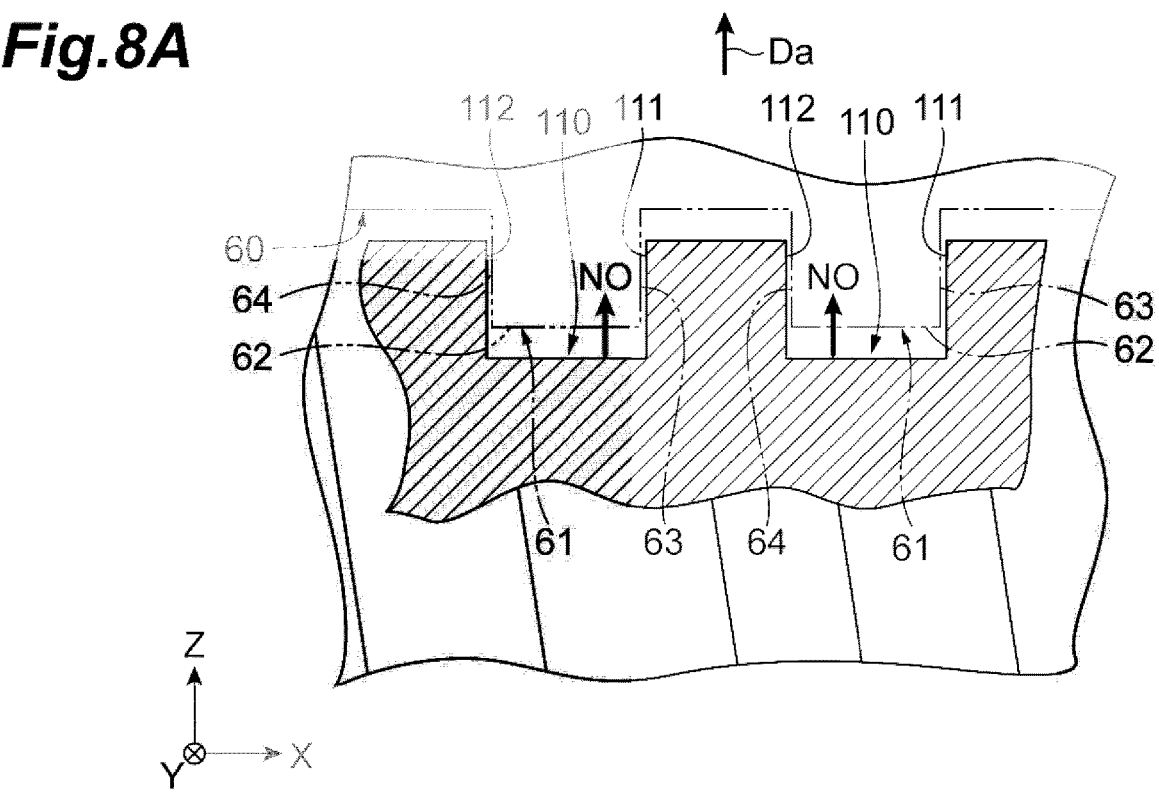
FIG. 8A is a diagram illustrating the inner body part shown in FIG. 7.
Figure 8B:
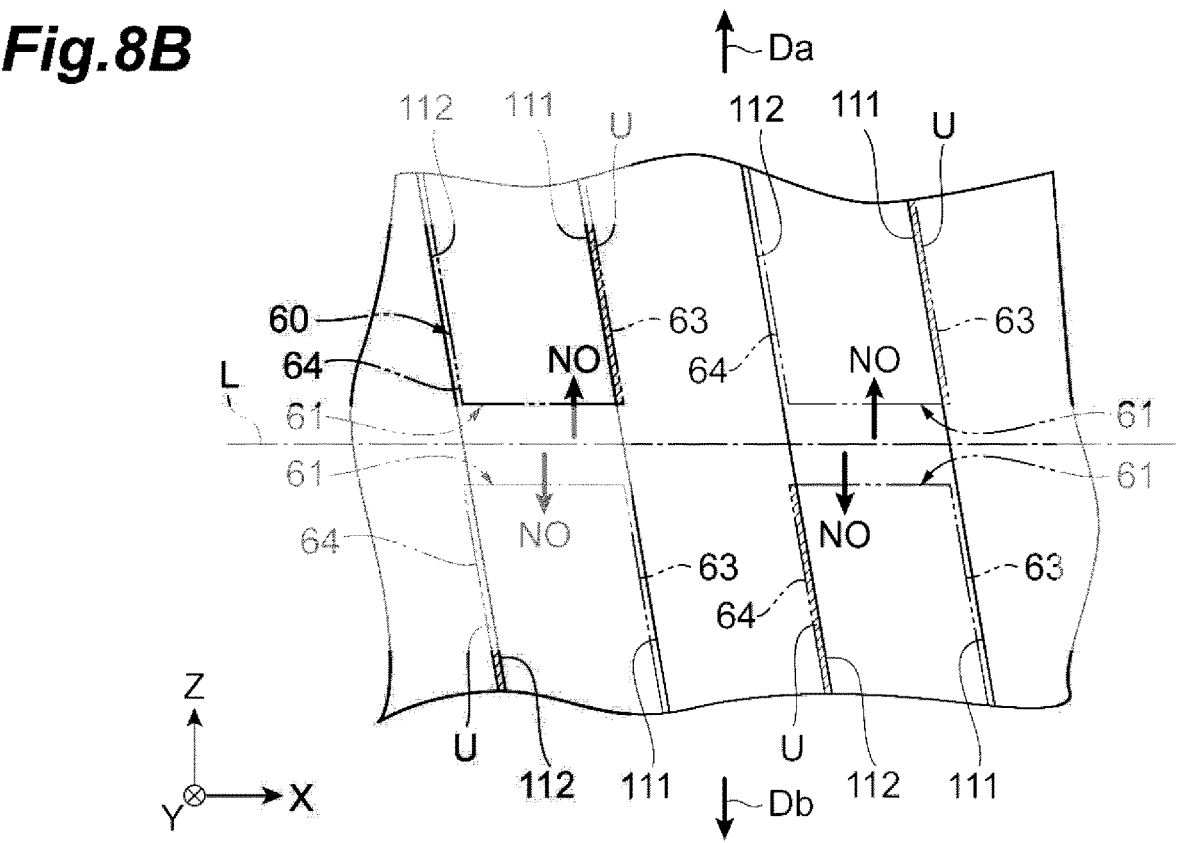
FIG. 8B is another diagram illustrating the inner body part shown in FIG. 7.

FIGS. 7, 8, and 9 show an inner housing 100 according to the comparative example. FIG. 7 is a side view of the inner housing 100 including a groove 110 according to the comparative example. FIG. 8A is an enlarged view of a region A1 shown in FIG. 7, partly cut away, and FIG. 8B is an enlarged side view of a region A2 shown in FIG. 7. FIG. 8A also shows, in a two-dot chain line, an expected position of a die 60 corresponding to the inner housing 100 after the die is removed (after being moved) assuming that the die 60 can be moved in the release direction. Moreover, FIG. 8B is an enlarged view of the region A2 shown in FIG. 7, and similarly to FIG. 8A, shows in two-dot chain lines, an expected position of the die 60 after the die is removed assuming that the die 60 can be moved in the release direction.

FIG. 9A is a schematic cross-sectional view of the inner housing 100 and the die 60 seen from the X direction, and FIG. 9B is a schematic cross-sectional view of the inner housing 100 and the die 60 seen from the Y direction, corresponding to FIG. 9A. For ease of explanation, in FIG. 9B, a top surface 62 of a projecting portion 61 of the die 60 is shown hatched, and a pair of side surfaces 63, 64 are shown in two-dot chain lines.

The difference between the inner housing 100 and the inner housing 5A according to an example is the shape of the groove 110 formed on the outer circumferential surface of the inner housing. That is, in the inner housing 100, each of the side surfaces 111 and 112 of the groove 110 does not have a draft angle that is inclined in a direction opposite each other, the draft angle inclined relative to the Z direction. In this case, the side surfaces 111 and 112 are formed along the Z direction in the XZ cross-section including the axis of rotation L (see FIGS. 8A and 9B).

In the comparative example, when the die 60 is moved in the release direction (see FIGS. 8B and 9B), the projecting portion 61 (top surface 62) of the die 60 is shifted in the X direction relative to the groove 110 in portions that form portions other than the top portion in the release direction of the groove 110. Since the side surface 111 of the groove 110 does not have a draft, when releasing from the die 60, some regions including the side surface 111 (regions shown in hatching in FIG. 8B) form undercuts U relative to the release direction along the Z direction. In other words, when releasing from the die 60, the some regions of the groove 110 interfere with the projecting portions 61 of the die 60. As a result, it will be difficult to remove the inner housing 100 from the die 60, and it may be difficult to carry out the molding process of the inner housing 100 by the die 60.

In contrast, in the rotary machine 1, each of the side surfaces 21, 22 of the groove 20 has the draft angle S that is inclined away from each other, the draft angle S determined relative to the release direction along the Z direction, as shown in FIG. 3. Moreover, in the rotary machine 1, at least the side surface 21 or 22 on the side that forms the undercut U relative to the release direction along the Z direction is formed having a draft. Thus, interference with the die 50 is prevented during removal of the die 50 from the inner housing 5A along the Z direction as shown in FIGS. 6A and 6B, when forming the inner housing 5A using the die 50. That is, each of the pair of side surfaces 21, 22 can avoid forming the undercut U relative to the die 50. This facilitates the release of the inner housing 5A from the die 50. The rotary machine 1 according to an example thus facilitates the molding process of the inner housing 5A using the die 50. Moreover, since the forming of the undercut U can be avoided as described above, it is not necessary to increase the number of parts in which to divide the die for demolding. This enables the manufacturing steps of the die 50 to be minimized and the manufacturing cost to be reduced. Furthermore, the manufacturing time and cost can be reduced by forming the groove 20 by the molding process compared to a case in which the groove 20 is formed by a machining process, and productivity of the inner housing 5A can be improved.

Additionally, in the rotary machine 1, the draft angle S is derived using formula (1) under the condition of formula (2). In this case, the draft angle S can be set to be greater than a value of the intersection point S1 in the graph shown in FIG. 4. The inner housing 5A can thus be more reliably released from the die 50 when forming the inner housing 5A by the molding process.

Additionally, in the rotary machine 1, at least the side surface of the pair of side surfaces 21, 22 of the groove 20 on a side that forms the undercut U relative to the release direction Da orthogonal to the axis of rotation L is formed having the draft angle S. As a result, the pair of side surfaces 21, 22 can avoid forming the undercuts U relative to the die 50. This facilitates the release of the inner housing 5A from the die 50.

Additionally, in the rotary machine 1, each of the pair of side surfaces 21, 22 of the groove 20 is inclined in the direction opposite each other. As a result, the pair of side surfaces 21, 22 are formed having the draft angles S, thereby facilitating the release of the inner housing 5A from the die 50 and the molding process of the inner housing 5A using the die 50.

An example method for manufacturing the inner housing 5A (inner body part) of the motor housing 5 (cooling jacket) above will be described next. The inner housing 5A is molded using the die 50 (mold). The die 50 includes a pair of dies that are separated in opposite directions relative to the axis of rotation L. The pair of dies includes the projecting portion 52 that corresponds to the groove 20 of the inner housing 5A. First, the die 50 (pair of dies) is clamped, and an inner cavity is filled with metal (molten metal). After the metal material is cooled for a predetermined time and solidified, each of the pair of dies is separated from the other in the release direction, that is, the direction orthogonal to the axis of rotation L and opposite to one another. As a result, the inner housing 5A is released from the die 50, and the inner housing 5A including the groove 20 having the draft angle S is molded.

It is to be understood that not all aspects, advantages and features described herein may necessarily be achieved by, or included in, any one particular example. Indeed, having described and illustrated various examples herein, it should be apparent that other examples may be modified in arrangement and detail.

In some of the examples described above, the inner housing 5A and the outer housing 5B are cylindrical, but the inner housing 5A and the outer housing 5B may have various shapes, for example, a partially notched cylindrical shape or a polygonal cylindrical shape.

In to some of the examples described above, the grooves 20 are arranged in parallel at regular intervals along the X direction in the XZ plane including the axis of rotation L of the inner housing 5A, but the grooves 20 may be arranged in a non-parallel alignment or at irregular intervals.

Figure 10:
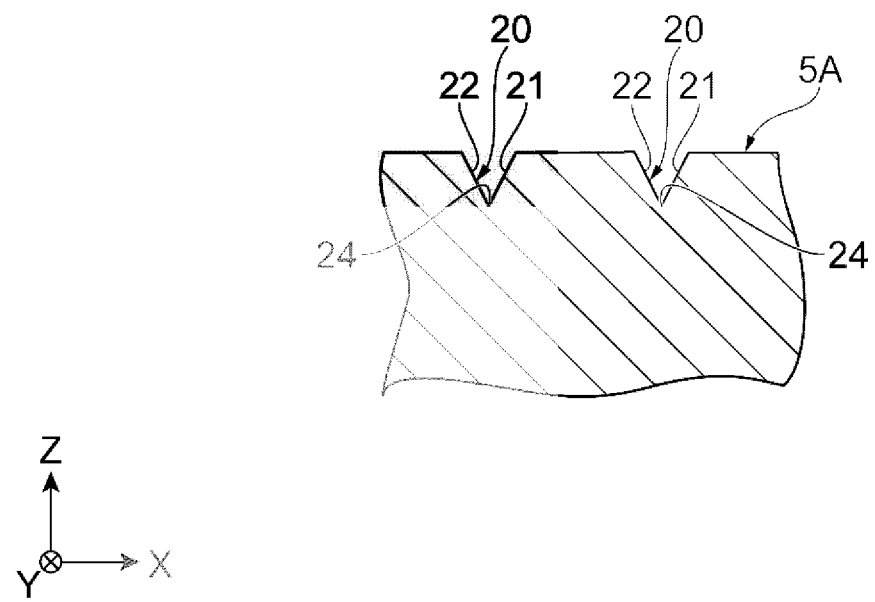
FIG. 10 is an enlarged cross-sectional view showing a groove portion of another example rotary machine.

Additionally, some of the example grooves described above have a flat bottom surface 23, but the groove 20 may be V-shaped in cross-sectional view with the bottom portion 24 of the side surface 21 directly connected to the bottom portion 24 of the side surface 22 (see FIG. 10). In some examples, the bottom portion 24 at which the side surface 21 and the side surface 22 are connected corresponds to the bottom surface.

While some of the examples described above include cooling water as the cooling medium that flows through the cooling passage 40, the cooling medium may be other cooling liquids, such as cooling gas or oil.

Moreover, the compressor 3 may, for example, be configured to compress liquid.

Furthermore, the rotary machine broadly includes rotary machines that have a motor, such as compressors, pumps, and blowers.

We claim:

1. A rotary machine comprising:
   a motor including a rotor and a stator; and
   a cooling jacket disposed around the stator, wherein the cooling jacket includes:
      a cylindrical inner body part in contact with the stator and comprising an outer circumferential surface that defines an outer diameter of the inner body part;
      a cylindrical outer body part surrounding the inner body part; and
      a helical groove formed in the outer circumferential surface of the inner body part and configured to transmit a cooling medium, the helical groove circling helically at an oblique angle around the inner body part a plurality of times,
   wherein the helical groove includes a pair of side surfaces opposed to each other in a direction of an axis of rotation of the rotor and a bottom surface, the pair of side surfaces connected to and extending from the bottom surface of the helical groove to the outer circumferential surface of the inner body part,
   wherein the inner body part has a virtual region being cylindrical about the axis of rotation, the virtual region having an outer diameter bounded by the bottom surface of the helical groove,
   wherein each of the side surfaces is formed having a draft angle that is inclined away from each other, the draft angle determined relative to a direction orthogonal to the axis of rotation, and
   wherein the draft angle is larger than the oblique angle of the helical groove and is derived using formula (1) under the condition of formula (2),

[Formula 1]
$$\frac{\mathrm{atan}\left[\frac{(D1-D2)/2\tan S}{D1/2\sin\{\mathrm{acos}(D2/D1)\}}\right]}{\mathrm{atan}\left(\frac{P}{\pi D1}\right)} > 1 \quad (1)$$

[Formula 2]
$$(D1-D2)\tan S + B < P \quad (2)$$

where S is the draft angle, D1 is the outer diameter of the inner body part, D2 is the outer diameter of the virtual region, P is an array pitch of the helical groove in the direction of the axis of rotation, and B is a width of the bottom surface in the direction of the axis of rotation.

2. The rotary machine according to claim 1, wherein the bottom surface of the groove is substantially flat and extends in the direction of the axis of rotation.

3. The rotary machine according to claim 1, wherein the draft angle is equal to or greater than approximately seven times the oblique angle of the helical groove, and
wherein the draft angle is equal to or less than 25°.

4. The rotary machine according to claim 1, further comprising:
   a rotating shaft that includes the rotor;
   a compressor housing fixed to the cooling jacket; and
   a compressor impeller accommodated inside the compressor housing and fixed to the rotating shaft.

5. The rotary machine according to claim 4, further comprising a bearing located between the rotor and the compressor impeller.

6. The rotary machine according to claim 5, wherein the inner body part includes a tubular portion holding the bearing.

7. The rotary machine according to claim 4,
wherein the inner body part includes an annular cover portion facing a coil end of the stator, and
wherein the outer body part includes an annular base portion contacting the annular cover portion and fixed to the compressor housing.

8. The rotary machine according to claim 7,
wherein the inner body part includes a tubular portion holding a second bearing supporting the rotating shaft, and
wherein the annular base portion is in contact with the annular cover portion.

9. The rotary machine according to claim 8, wherein the outer body part further includes a cylindrical body portion surrounding the inner body part and a lid portion disposed opposite the annular base portion so as to block an opening of the cylindrical body portion.

10. The rotary machine according to claim 9, wherein the lid portion includes a cylindrical bearing holding portion holding the second bearing, the second bearing supporting the rotating shaft.

11. A method for manufacturing the inner body part of the rotary machine according to claim 1, the method comprising:
- clamping a mold including at least one die, an inner surface of the die forming part of a helical projection circling helically at the oblique angle inside the mold, wherein the helical projection includes a pair of side surfaces, wherein each of the side surfaces of the helical projection is formed having a draft angle, the draft angle determined relative to a direction orthogonal to a longitudinal direction of the mold;
- filling an inner cavity of the mold with molten metal;
- solidifying the molten metal to form the inner body part of the rotary machine; and
- separating the mold in the orthogonal direction, wherein the draft angle is equal to or greater than approximately seven times the oblique angle and equal to or less than 25° to facilitate a release of the inner body part from the die.

12. The method according to claim 11,
wherein the bottom surface of the groove is substantially flat and extends in the direction of the axis of rotation.

13. A rotary machine comprising:
- a motor including a rotor and a stator; and
- a cooling jacket disposed around the stator, wherein the cooling jacket includes:
- a cylindrical inner body part in contact with the stator and comprising an outer circumferential surface that defines an outer diameter of the inner body part;
- a cylindrical outer body part surrounding the inner body part; and
- a V-shaped groove formed in the outer circumferential surface of the inner body part and configured to transmit a cooling medium, the V-shaped groove circling helically at an oblique angle around the inner body part a plurality of times,
wherein the V-shaped groove includes a pair of side surfaces opposed to each other in a direction of an axis of rotation of the rotor, and the pair of side surfaces are directly connected to each other at a bottom of the V-shaped groove,
wherein the pair of side surfaces extend from the bottom of the V-shaped groove to the outer circumferential surface of the inner body part,
wherein the inner body part has a virtual region being cylindrical about the axis of rotation, the virtual region having an outer diameter bounded by the bottom of the V-shaped groove,
wherein each of the side surfaces is formed having a draft angle that inclined away from each other, the draft angle determined relative to a direction orthogonal to the axis of rotation, and
wherein the draft angle is larger than the oblique angle of the V-shaped groove, and is derived using formula (1) under the condition of formula (3),

[Formula 1]

$$\frac{\mathrm{atan}\left[\frac{(D1-D2)/2\tan S}{D1/2\sin\{\mathrm{acos}(D2/D1)\}}\right]}{\mathrm{atan}\left(\frac{P}{\pi D1}\right)} > 1 \quad (1)$$

[Formula 3]

$$(D1-D2)\tan S < P \quad (3)$$

where S is the draft angle, D1 is the outer diameter of the inner body part, D2 is the outer diameter of the virtual region, and P is an array pitch of the V-shaped groove in the direction of the axis of rotation.

14. The rotary machine according to claim 13, further comprising:
- a rotating shaft that includes the rotor;
- a compressor housing fixed to the cooling jacket;
- a compressor impeller accommodated inside the compressor housing and fixed to the rotating shaft; and
- a bearing that supports the rotating shaft and is located between the rotor and the compressor impeller.

15. The rotary machine according to claim 13,
wherein the draft angle is equal to or greater than approximately seven times the oblique angle of the V-shaped groove, and
wherein the draft angle is equal to or less than 25°.

16. A method for manufacturing the inner body part of the rotary machine according to claim 13, the method comprising:
- clamping a mold including at least one die, an inner surface of the die forming part of a helical projection circling helically at the oblique angle inside the mold, wherein the helical projection includes a pair of side surfaces, wherein each of the side surfaces of the helical projection is formed having a draft angle, the draft angle determined relative to a direction orthogonal to a longitudinal direction of the mold;
- filling an inner cavity of the mold with molten metal;
- solidifying the molten metal to form the inner body part of the rotary machine; and
- separating the mold in the orthogonal direction, wherein the draft angle is equal to or greater than approximately seven times the oblique angle and equal to or less than 25° to facilitate a release of the inner body part from the die.

* * * * *